United States Patent Office 2,997,400
Patented Aug. 22, 1961

2,997,400
METHOD AND COMPOSITION FOR FORMING
PRECISION MOLDS
Herbert Greenewald, Jr., 5725 Ridgetown Circle,
Dallas 30, Tex.
No Drawing. Filed Aug. 27, 1959, Ser. No. 836,340
10 Claims. (Cl. 106—38.9)

This invention relates to a method of and composition for forming ceramic articles especially adapted for use as precision casting molds.

Ceramic molds for foundry use, heretofore, have been formed either from a cast slurry consisting of a refractory powder and a quick setting ethyl silicate bond, or pressformed from a damp powder usually consisting of silica flour with a water glass binder, or silica flour with a bentonite binder. The cast slurry procedure has the disadvantages of slow production rate, poor pot life, that is, requiring the mixing of small, individual batches for immediate use, high cost of binding material, and warpage and distortion resultant from the high liquid content of the mix. The silica flour-water glass material has very poor thermal shock resistance, is quite fusible, forms slags with most molten metals, and the bond migrates badly to the surface of the mold. The silica flour-bentonite mix is a considerable improvement over the silica-water glass material in these respects, but still has relatively poor hot creep strength and rigidity, a serious tendency to distort and bow during the drying cycle, and a serious lack of surface hardness which makes it impossible to adequately clean the mold surfaces before assembly without destroying the mold surface itself. Such molds are so weak that it is very difficult if not impossible to handle the molds in regular production without losing fifty percent or more of the molds baked through breakage.

Accordingly, the main object of the present invention is to provide a ceramic material particularly adapted for foundry use which overcomes the above disadvantages.

A more detailed object is to provide an agglomerate for forming ceramic articles of the above type in which warpage and distortion is largely eliminated.

Another detailed object is to provide a ceramic article of the above type having good strength characteristics for use in larger size molds.

Another object is to provide a ceramic mold having exceptionally smooth surfaces and good dimensional tolerances.

Another detailed object is to provide an agglomerate for forming ceramic objects of the above type which are free of cracked or spalled surfaces.

Another more detailed object is to provide a ceramic article of the above type having a very hard surface and a softer, yet adequately strong, interior, which is ideally suited for molding precision castings.

Still another object is to provide a ceramic article of the above type which is stronger and dimensionally more stable than previous material for the purpose.

According to the present invention, I form a damp agglomerate ceramic consisting of the following ingredients in the preferred proportions as stated, all parts being by weight:

1,000 parts silica flour (200 mesh preferred)
20 parts non-acidic bentonite
2 parts sodium hydroxide
180 parts water The silica flour (basic ceramic ingredient) and bentonite are thoroughly mixed to form a dry composite. The sodium hydroxide is then thoroughly dissolved in the water and the solution added to the dry composite to form a thoroughly mixed agglomerate. The mixed material is then firmly pressed or hard rammed into molds about a pattern, preferably metal, and within a rugged flask, such as one made of steel. The rammed or pressed molds are then removed from the pattern plate and set on a ground, flat plate, the flask is removed, and the mold is baked at from 400° F. to 800° F. for from one-half hour to six hours depending on the size of the mold. The molds are then normally assembled into stacks, preheated, and poured. For the casting of aluminum and magnesium the preheating step is usually omitted.

The use of the bonding system disclosed in this application, namely, the mixture of bentonite and sodium hydroxide in closely controlled amounts and a fine silica, combined with the heating of this material to approximately 400° F. to cause a chemical reaction between the sodium hydroxide and the silica and bentonite to form a bond in situ, probably consisting of sodium aluminosilicate, is not limited to the bonding of silica flour, but has also been extended to the bonding of silica sand-silica flour mixtures where the proportion of sand has been increased to as high as 80 percent.

No other additive, for instance, water glass of equal sodium content, as far as I am aware can replace the sodium hydroxide with equivalent results. The effect of the sodium hydroxide in the formation of molds usable at high temperatures is unexpected because of its well known fluxing action. The resultant finished article has a high degree of resistance to fusion, excellent hot rigidity, surface hardness, resistance to water, dimensional stability during setting, and strength at room temperature so as to resist damage from handling. Where split molds are used, the greatly improved dimensional stability over that attained with the silica-bentonite mix heretofore used, results in better mating of the mold halves, and therefore, castings of superior dimensional accuracy.

The sodium hydroxide content is critical. For steel castings, the practical limits are from one part per 1,000 parts of silica to 8 parts per 1,000 parts of silia. Below one part per 1,000 parts of silica, the mold surface is insufficiently hard, and above 8 parts per 1,000 parts of silica, the mold becomes so fusible that the surface of the casting becomes uneconomical to finish. For lower melting point alloys, such as brasses, aluminum, and magnesium, the sodium hydroxide content can be increased to as high as 20 parts per 1,000. Above 20 parts per 1,000, the mold starts to crack and deteriorate during the drying cycle.

The use of other basic ceramic materials is contemplated, such as fine quartz sand, alumina, zircon, zirconia and other granular silica materials. At least 20 percent of fine (200 mesh) ceramic material appears necessary. The western non-acidic bentonite is added to the mix to provide resistance to thermal shock, improved compressibility of the molding material, and a stronger mold than would otherwise result through its chemical reaction with the sodium hydroxide.

The bentonite may be varied from one percent to three percent by weight, more than three percent of bentonite causes the mold to distort excessively during drying. Less than one percent of the bentonite will result in thermal shock problems during preheat. As defined in Metals Handbook, vol. I—Properties and Selection of Metals, published by American Society of Metals, Metals Park, Novelty, Ohio, bentonite is "A colloidal clay-like substance derived from the decomposition of volcanic ash composed chiefly of the montmorillonite family. Western bentonite is slightly alkaline; southern bentonite is usually slightly acidic." A further indication of its non-acidic nature is contained in the technical requirements for western bentonite covered by Specification 13T of the Steel Founders Society of America wherein the pH value is indicated at 8.2 or higher (Foundry, March 1958, page 127). The bentonite I use in the instant composition is the western, non-acidic, swelling type. As is well known in the art, and as explained in Patent No. 2,128,404, all clays swell to some extent when placed in water but a "swelling" clay is characterized by western or Wyoming bentonite, a distinguishing feature of which is the tremendous swelling which takes place on addition of water, forming a stiff gel with up to ten times its own weight of water. The term "non-acidic bentonite" as used herein is intended to refer to the montmorillonite clay commonly known as western or Wyoming bentonite.

The water content is also critical. It can vary between 100 and 250 parts per 1,000 of silica flour, as the fineness of the silica grains vary. The finer the silica, the more water required, and the coarser the silica, the less water required. For the particular grade of 200 mesh silica which I prefer, the water content should be from 165 to 180 parts per 1,000 parts of silica. Below the minimum water content, the molds are excessively soft after baking, and above the stated maximum, the molding material requires excessive pressure to obtain good surface finish on the molds.

The invention may be modified in various respects as will occur to those skilled in the art and exclusive use of all modifications as come within the scope of the appended claims is contemplated.

I claim:

1. A thermo-setting molding material for forming ceramic molds and the like consisting essentially of an agglomerate of approximately 1,000 parts by weight of silica flour, from approximately 10 parts to approximately 30 parts by weight of non-acidic bentonite reactive with sodium hydroxide at a temperature of about 400° F. to form a water proof bond from approximately one part to approximately 20 parts by weight of sodium hydroxide, as determined by the melting point of the metal to be cast, and from approximately 100 parts to approximately 250 parts by weight of water.

2. Molding material for forming baked ceramic molds and the like consisting essentially of an agglomerate of approximately 1,000 parts by weight of approximately 200 mesh silica flour, approximately 20 parts by weight of non-acidic bentonite, approximately two parts by weight of sodium hydroxide, the non-acidic bentonite and sodium hydroxide being adapted to have a chemical reaction when the material is subjected to temperatures above 400° F. to form a water proof bond, and approximately 180 parts by weight of water.

3. A molding sand for forming baked ceramic molds and the like consisting essentially of an agglomerate of approximately 84 percent by weight of silica flour, approximately 1.7 percent by weight of non-acidic bentonite, reactive with sodium hydroxide at a temperature above 400° F. to form a strong waterproof bonding agent, approximately .17 percent by weight of sodium hydroxide, and approximately 14.13 percent by weight of water.

4. A molding sand for use in forming baked ceramic molds and the like consisting essentially of a thoroughly mixed agglomerate of approximately 1,000 parts by weight of silica flour, from 10 parts to 30 parts by weight of non-acidic bentonite reactive with sodium hydroxide at a temperature of about 400° F. to form a bond in situ, from one part to eight parts by weight of sodium hydroxide as determined by the melting point of the metal to be cast, and from 100 parts to 250 parts by weight of water, the percentage of water increasing from the minimum limit in proportion to the fineness of the silica flour grains.

5. A molding sand for use in forming baked ceramic molds and the like consisting essentially of a thoroughly mixed agglomerate of from 200 parts to 1,000 parts by weight of silica flour, from 800 parts to 0 parts by weight of silica sand, the silica flour and silica sand totaling approximately 1,000 parts, from 10 parts to 30 parts by weight of non-acidic bentonite reactive with sodium hydroxide at a temperature of 400° F. to form a strong, waterproof bond in situ as a reaction product, from one part to 20 parts by weight of sodium hydroxide, the quantity of sodium hydroxide being reduced as the melting point of the cast metal increases, and from 100 parts to 250 parts by weight of water, the quantity of water increasing with the fineness of the silica flour grains.

6. A chemically bonded, ceramic article in the form of a pressed and baked agglomerate consisting essentially of approximately 1,000 parts by weight of silica flour, approximately 20 parts by weight of non-acidic bentonite, approximately 2 parts by weight of sodium hydroxide, and approximately 180 parts by weight of water, the non-acidic bentonite and sodium hydroxide being adapted to have a chemical reaction when the agglomerate is subjected to baking temperatures above 400° F. to form a strong waterproof bond throughout the agglomerate.

7. The method of forming a ceramic article such as a casting mold which consists in thoroughly mixing approximately 1,000 parts by weight of silica flour and approximately 10 parts to 30 parts by weight of non-acidic bentonite; dissolving from one to eight parts by weight of sodium hydroxide in from 100 to 250 parts by weight of water; thoroughly mixing the dry and wet ingredients, firmly ramming the resultant agglomerate into a molding flask about a pattern, removing the pattern and flask from the mold, and baking the mold at a temperature of from 400° F. to 800° F. for a period of from one-half hour to six hours depending upon the size of the mold, the non-acidic bentonite and sodium hydroxide being adapted to have a chemical reaction when the article is subjected to baking temperatures above 400° F. to form a strong waterproof bond throughout the article.

8. The method of forming a chemically bonded, thermo-setting ceramic material especially adapted for molds which consists essentially of forming a thoroughly mixed, dry composite of approximately 1,000 parts by weight of silica flour and 20 parts by weight of non-acidic bentonite, dissolving approximately 17 parts by weight of sodium hydroxide in approximately 180 parts by weight of water, adding together the wet and dry ingredients and thoroughly mixing the same into a damp agglomerate, firmly pressing the agglomerate into a molding flask about a pattern, removing the pattern and flask from the mold, and baking the mold at a temperature of 400° F. to 800° F. from one-half hour to six hours depending on the size of the mold, the non-acidic bentonite and sodium hydroxide being adapted to have a chemical reaction when the material is subjected to baking temperatures above 400° F. to form a strong waterproof bond throughout the material.

9. The method of compounding a ceramic article particularly adapted for use as casting mold which consists in the steps of thoroughly mixing a dry composite consisting essentially of approximately 1,000 parts by weight of a mixture of silica flour and silica sand with 10 parts to 30 parts by weight of non-acidic bentonite; dissolving sodium hydroxide in the proportion of from 1 part to 20 parts by weight in water in the proportion of from 100 parts to 250 parts by weight, the proportion of sodium hydroxide being variable inversely with the melting point of the metal to be cast and the proportion of water increasing with the average fineness of the silica grains, agglomerating the wet and dry ingredients, firmly pressing the damp agglomerate into a molding flask about a pattern, removing the pattern and flask from the molded article, and baking the molded article at from 400° F. to 800° F. for one-half hour to six hours depending on the size of the article, the non-acidic bentonite and sodium hydroxide being adapted to have a chemical reaction when the article is subjected to baking temperatues above 400° F. to form a strong waterproof bond throughout the article.

10. The method of forming a ceramic article suitable for casting molds which consists in the steps of forming approximately 1,000 parts by weight of a dry composite of silica flour and silica sand, mixing therewith approximately 20 parts by weight of non-acidic bentonite, adding thereto a wet composite consisting essentially of approximately 2 parts by weight of sodium hydroxide, and approximately 180 parts by weight of water, compacting the agglomerate in a mold, removing the compacted article from the mold, and heating the same at from 400° F. to 800° F. for from one-half hour to six hours depending on the size of the molded article, the non-acidic bentonite and the sodium hydroxide reacting during the baking temperature to form a chemical bond in situ.

References Cited in the file of this patent

UNITED STATES PATENTS

| | | |
|---|---|---|
| 2,071,452 | Bloch | Feb. 23, 1937 |
| 2,128,404 | Dunbeck | Aug. 30, 1938 |
| 2,237,592 | Dunbeck | Apr. 8, 1941 |
| 2,586,814 | Greenewald | Feb. 26, 1952 |
| 2,701,207 | Greenewald | Feb. 1, 1955 |